US012650716B2

(12) United States Patent

Wang et al.

(10) Patent No.: US 12,650,716 B2

(45) Date of Patent: Jun. 9, 2026

(54) EXPANSION CARD ASSEMBLY, CIRCUIT BOARD ASSEMBLY AND ELECTRONIC DEVICE

(71) Applicant: ASUSTeK COMPUTER INC., Taipei City (TW)

(72) Inventors: Xu Wang, Taipei City (TW); Chien-Lung Chang, Taipei City (TW); Fangping Yuan, Taipei City (TW); Liang Huang, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 155 days.

(21) Appl. No.: 18/515,214

(22) Filed: Nov. 20, 2023

(65) Prior Publication Data

US 2024/0345637 A1 Oct. 17, 2024

(30) Foreign Application Priority Data

Apr. 14, 2023 (TW) ................................. 112114039

(51) Int. Cl.
*G06F 1/185* (2026.01)

(52) U.S. Cl.
CPC .................................... *G06F 1/185* (2013.01)

(58) Field of Classification Search
CPC ......... G06F 1/185; G06F 1/186; G06F 13/409
See application file for complete search history.

(56) References Cited

U.S. PATENT DOCUMENTS

| | | | | |
|---|---|---|---|---|
| 9,600,040 | B1 * | 3/2017 | Han | .......................... G06F 1/186 |
| 10,032,356 | B1 * | 7/2018 | Han | .......................... G06F 1/20 |
| 10,827,645 | B2 | 11/2020 | Chen et al. | |
| 12,322,888 | B2 * | 6/2025 | Spencer | ............... H01R 12/737 |
| 2015/0189058 | A1 | 7/2015 | Hwang | |
| 2021/0013648 | A1 | 1/2021 | Spencer et al. | |

FOREIGN PATENT DOCUMENTS

| | | |
|---|---|---|
| CN | 104703501 | 6/2015 |
| CN | 108459979 | 8/2018 |
| CN | 213545165 | 6/2021 |
| CN | 113973425 | 1/2022 |
| CN | 114254576 | 3/2022 |
| TW | 481418 | 3/2002 |
| TW | 201606516 | 2/2016 |
| TW | 202010189 | 3/2020 |

* cited by examiner

*Primary Examiner* — James Wu

(74) *Attorney, Agent, or Firm* — JCIPRNET

(57) ABSTRACT

An electronic device includes a circuit board assembly and an expansion card assembly. The circuit board assembly includes a circuit board body, a first circuit board connection port, a second circuit board connection port, and a third circuit board connection port. The expansion card assembly is adapted for plugging in the circuit board assembly, and includes an expansion card body, a first expansion card connection port, and a second expansion card connection port. When the expansion card assembly is plugged in the circuit board assembly, the first expansion card connection port is docked with the first circuit board connection port, the second expansion card connection port is docked with the second circuit board connection port, and the third circuit board connection port is electrically connected to the expansion card body through the second circuit board connection port and the second expansion card connection port.

8 Claims, 9 Drawing Sheets

1

EXPANSION CARD ASSEMBLY, CIRCUIT BOARD ASSEMBLY AND ELECTRONIC DEVICE

CROSS-REFERENCE TO RELATED APPLICATION

This application claims the priority benefit of Taiwan application serial no. 112114039, filed on Apr. 14, 2023. The entirety of the above-mentioned patent application is hereby incorporated by reference herein and made a part of this specification.

BACKGROUND

Technical Field

This present disclosure relates to an expansion card assembly, a circuit board assembly, and an electronic device, and in particular relates to an expansion card assembly that may not be directly plugged to an external power supply, a circuit board assembly that may be plugged into an external power supply, and an electronic device having the above components.

Description of Related Art

As the performance of a display card chip continues to improve, the power consumption of the graphics card also becomes higher. In conventional methods, the PCI-E connection port of the motherboard is utilized to supply power to a graphics card, and such methods are not suitable for graphics card of which the power consumption exceeds 75 W. When the power consumption of the graphics card exceeds 75 W, the conventional power supply method is to adopt an external power supply to directly supply power to the graphics card.

However, the wires of external power supply may be bent and twisted during use due to the limitation of the space of the computer case. The bent and twisted wires and the weight of the wires may cause the connection port of the external power supply to incline and result in poor connection and potential safety hazards. In addition, when the external power supply wire protrudes from the graphics card, the protruding wire may interfere with the side panel of the computer case, resulting in an unsmooth operation when the computer case is opened or closed. Moreover, when being used with a see-through computer case, the external power wire will also reduce the aesthetic quality of the computer case.

SUMMARY

This present disclosure provides an expansion card assembly, which includes an expansion card body, a first expansion card connection port and a second expansion card connection port. The first expansion card connection port is disposed on the expansion card body.

The second expansion card connection port is disposed on the expansion card body. The interface of the first expansion card connection port is different from the interface of the second expansion card connection port.

The present disclosure further provides a circuit board assembly, which includes a circuit board body, a first circuit board connection port, a second circuit board connection port and a third circuit board connection port. The first circuit board connection port is disposed on the circuit board body. The second circuit board connection port is disposed on the circuit board body. The interface of the first circuit board connection port is different from the interface of the second circuit board connection port. The first circuit board connection port and the second circuit board connection port are close to each other and arranged along an axis. The third circuit board connection port is disposed on the circuit board body and is electrically connected to the second circuit board connection port.

This present disclosure provides an electronic device, which includes a circuit board assembly and an expansion card assembly. The circuit board assembly includes a circuit board body, a first circuit board connection port, a second circuit board connection port and a third circuit board connection port. The first circuit board connection port is disposed on the circuit board body. The second circuit board connection port is disposed on the circuit board body. The interface of the first circuit board connection port is different from the interface of the second circuit board connection port. The first circuit board connection port and the second circuit board connection port are close to each other and arranged along an axis. The third circuit board connection port is disposed on the circuit board body and is electrically connected to the second circuit board connection port. The expansion card assembly is pluggably disposed on the circuit board assembly, and includes an expansion card body, a first expansion card connection port and a second expansion card connection port. The first expansion card connection port is disposed on the expansion card body. The second expansion card connection port is disposed on the expansion card body. The interface of the first expansion card connection port is different from the interface of the second expansion card connection port. When the expansion card assembly is plugged into the circuit board assembly, the first expansion card connection port is docked with the first circuit board connection port, the second expansion card connection port is docked with the second circuit board connection port, and the third circuit board connection port is electrically connected to the expansion card body through the second circuit board connection port and the second expansion card connection port.

Based on the above, in this present disclosure, the external power supply may supply power to the expansion card assembly through the circuit board assembly. Since the external power supply may not be directly connected to the expansion card assembly, it is possible to prevent the external power supply from causing the wires to be bent and twisted due to being directly connected to the expansion card assembly and/or causing the wires to interfere with the computer case, thereby improving the safety of use, the adaptability of the wire and the computer case, as well as the aesthetic quality of overall appearance.

DESCRIPTION OF THE EMBODIMENTS

Figure 1:
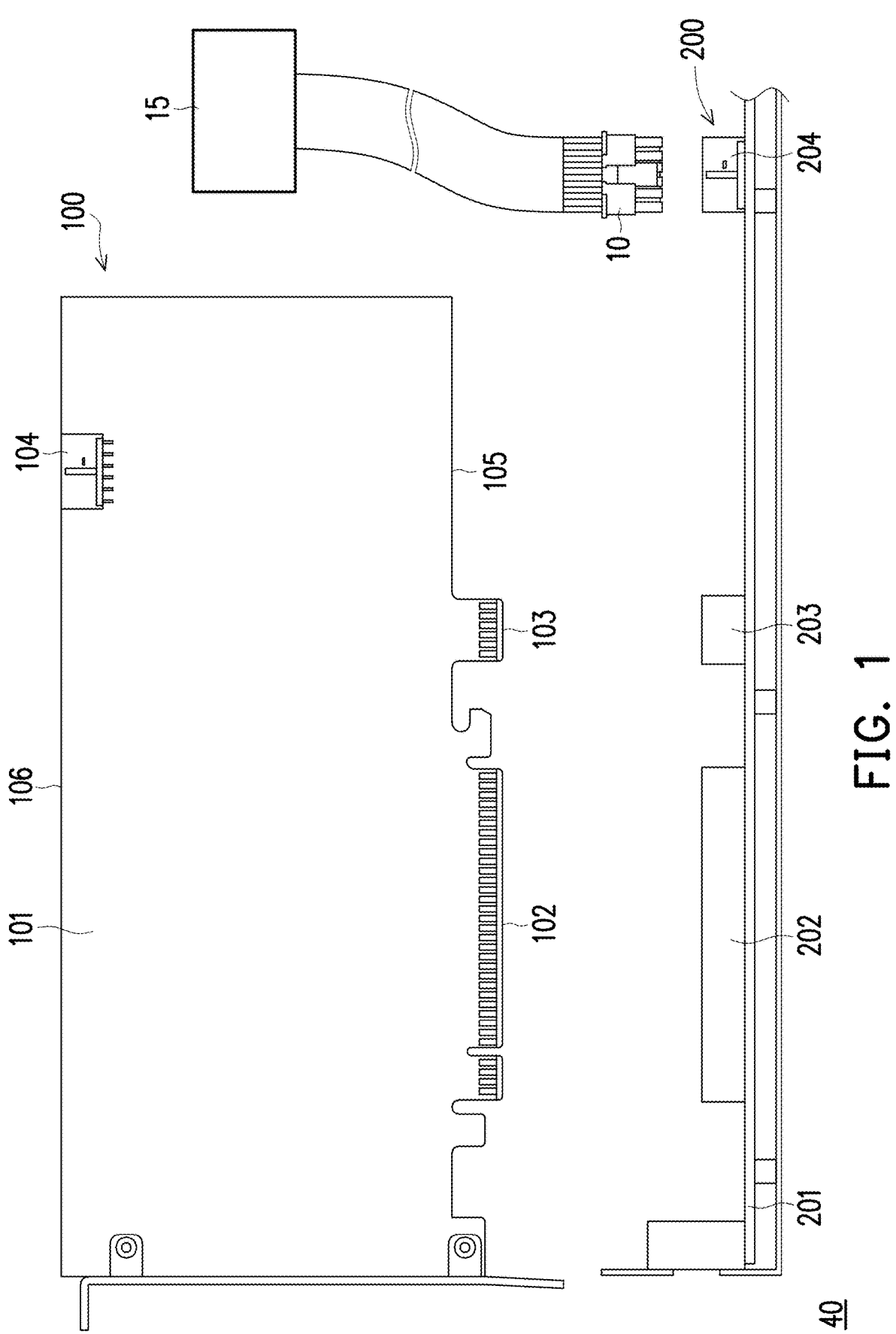
FIG. 1 is a schematic diagram of a circuit board assembly and an expansion card assembly before assembly according to an embodiment of the present disclosure.

As shown in FIG. 1, an electronic device 40 of this embodiment includes an expansion card assembly 100 and a circuit board assembly 200. The expansion card assembly 100 is, for example, a graphics card or a network card, and the circuit board assembly 200 is, for example, a motherboard, but the types of the expansion card assembly 100 and the circuit board assembly 200 are not limited thereto.

The expansion card assembly 100 includes an expansion card body 101, a first expansion card connection port 102 and a second expansion card connection port 103. The first expansion card connection port 102 and the second expansion card connection port 103 are disposed on the expansion card body 101.

In this embodiment, the interface of the first expansion card connection port 102 is different from the interface of the second expansion card connection port 103. For example, the first expansion card connection port 102 is a PCI-E connection port, and the second expansion card connection port 103 is a power transmission connection port, but the types of the first expansion card connection port 102 and the second expansion card connection port 103 are not limited thereto.

It can be seen from FIG. 1 that in this embodiment, the first expansion card connection port 102 and the second expansion card connection port 103 are gold finger connection ports. The expansion card body 101 includes a first edge 105, and the first expansion card connection port 102 and the second expansion card connection port 103 protrude from the first edge 105 and are arranged along the first edge 105.

Please continue to refer to FIG. 1, the circuit board assembly 200 of this embodiment includes a circuit board body 201, a first circuit board connection port 202, a second circuit board connection port 203 and a third circuit board connection port 204. The first circuit board connection port 202, the second circuit board connection port 203 and the third circuit board connection port 204 are disposed on the circuit board body 201.

Figure 2:
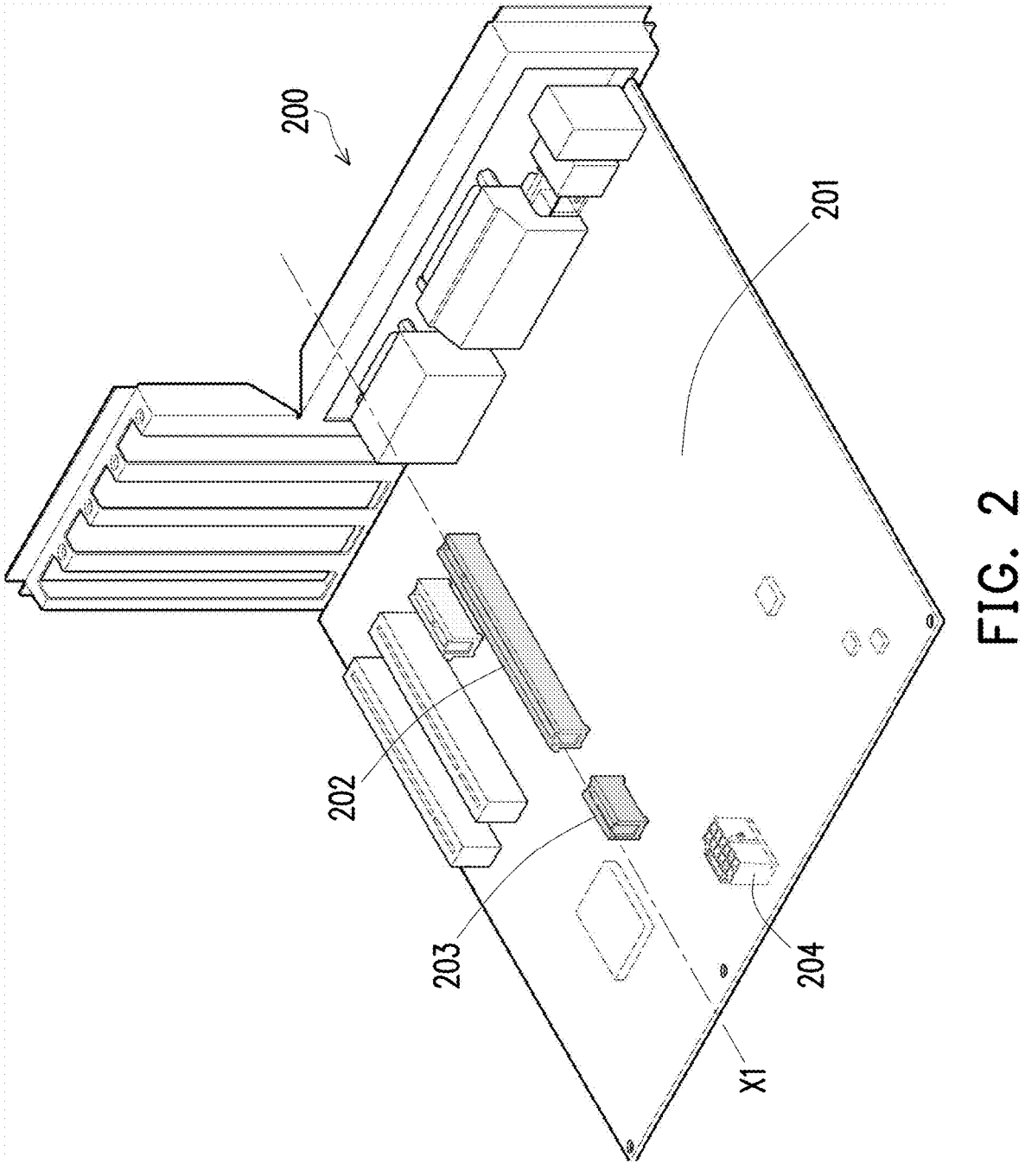
FIG. 2 is a three-dimensional schematic diagram of a circuit board assembly according to an embodiment of the present disclosure.

As shown in FIG. 2, the first circuit board connection port 202 and the second circuit board connection port 203 are arranged close to each other and along an axis X1. The interface of the first circuit board connection port 202 is different from the interface of the second circuit board connection port 203. In this embodiment, the first circuit board connection port 202 is, for example, a PCI-E connection port, and the second circuit board connection port 203 is, for example, a power transmission connection port.

In addition, in this embodiment, the third circuit board connection port 204 is an external power supply connection port, and the third circuit board connection port 204 is electrically connected to the second circuit board connection port 203. It should be noted that the number of the third circuit board connection port 204 is not limited to one and may be multiple (for example, 4), and may be of different specifications and types.

Figure 3:
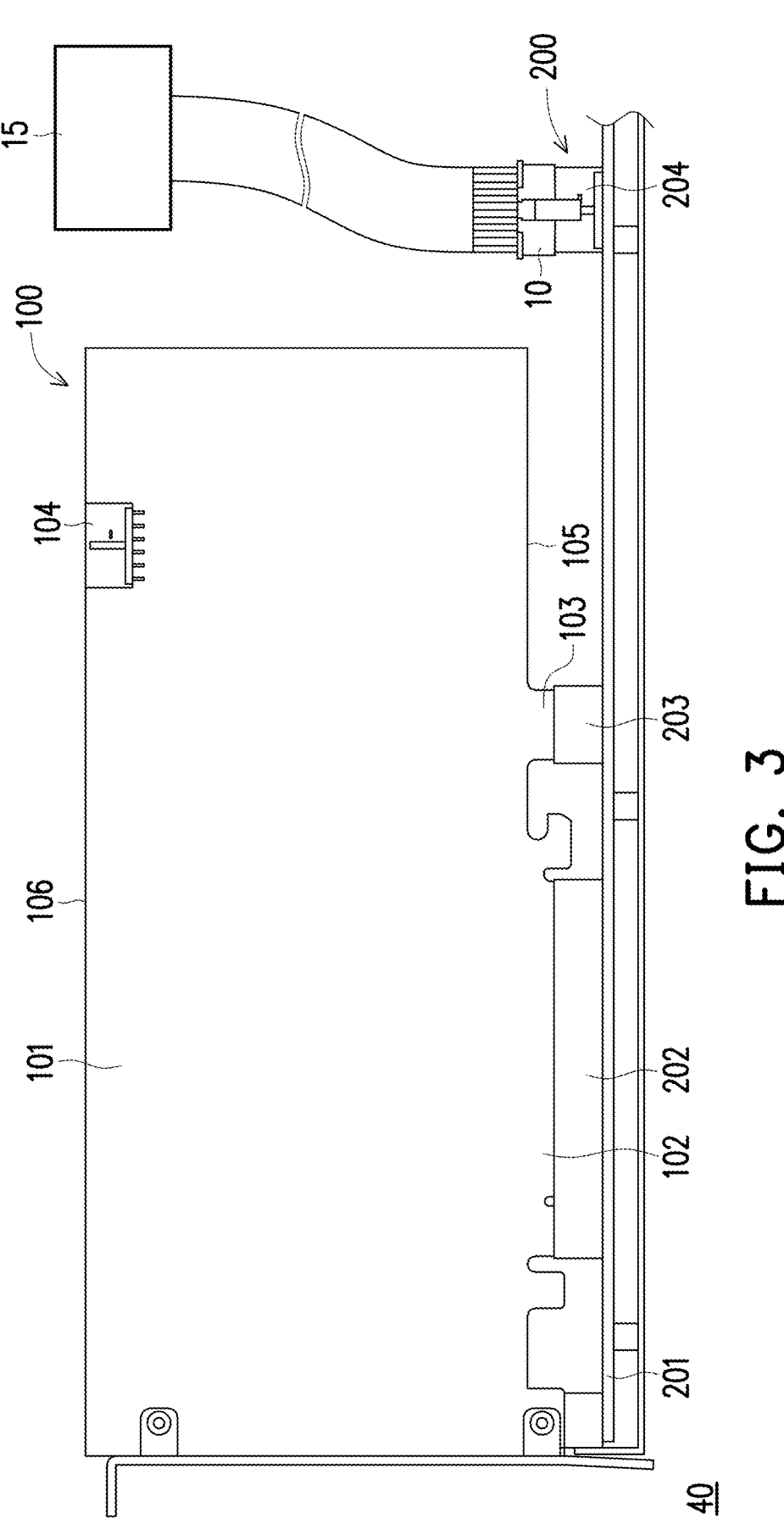
FIG. 3 is a schematic diagram of the circuit board assembly and the expansion card assembly of FIG. 1 after assembly.

As shown in FIG. 3, when the expansion card assembly 100 is plugged into the circuit board assembly 200, the first expansion card connection port 102 is docked with the first circuit board connection port 202, the second expansion card connection port 103 is docked with the second circuit board connection port 203, and the third circuit board connection port 204 is electrically connected to the expansion card body 101 through the second circuit board connection port 203 and the second expansion card connection port 103.

Therefore, the external power supply connection port 10 of the external power supply 15 may be docked with the third circuit board connection port 204 of the circuit board assembly 200, and supplies power to the expansion card assembly 100 through the third circuit board connection port 204, the second circuit board connection port 203 and the second expansion card connection port 103.

In this embodiment, since the space above or below the circuit board assembly 200 is large, more space may be available for the wire arrangement of the external power supply 15. The design that the external power supply 15 is connected to the circuit board assembly 200 and not directly connected to the expansion card assembly 100 makes it possible to prevent the external power supply 15 from causing the wires to be bent and twisted due to being directly connected to the expansion card assembly 100 and/or causing the wires to interfere with the computer case. In this way, the electronic device 40 of this embodiment may have improved safety in use, compatibility between the wire and the computer case, and aesthetic quality of overall appearance.

It should be noted that, in this embodiment, in order to increase the compatibility with the conventional circuit board assembly 20 (see FIG. 6), the expansion card assembly 100 further optionally includes a third expansion card connection port 104. The expansion card body 101 includes a second edge 106, and the third expansion card connection port 104 is disposed on the expansion card body 101 and close to the second edge 106.

In this embodiment, the second edge 106 is located on the opposite side of the first edge 105, but the second edge 106 may also be connected to the first edge 105, for example, located at the right edge of the expansion card body 101 in FIG. 1. The third expansion card connection port 104 is an external power connection port. That is to say, in a state not shown, the third expansion card connection port 104 of the expansion card assembly 100 may be used for being connected with the external power supply connection port 10 of the external power supply 15, so that the external power supply 15 supplies power to the expansion card assembly 100.

It should be noted that, in this embodiment, the expansion card assembly 100 may additionally be provided with a chip (not shown) to automatically identify whether the current of the external power supply 15 is from the second expansion card connection port 103 or the third expansion card connection port 104 to switch the path of current and signal transmission.

Figure 4:
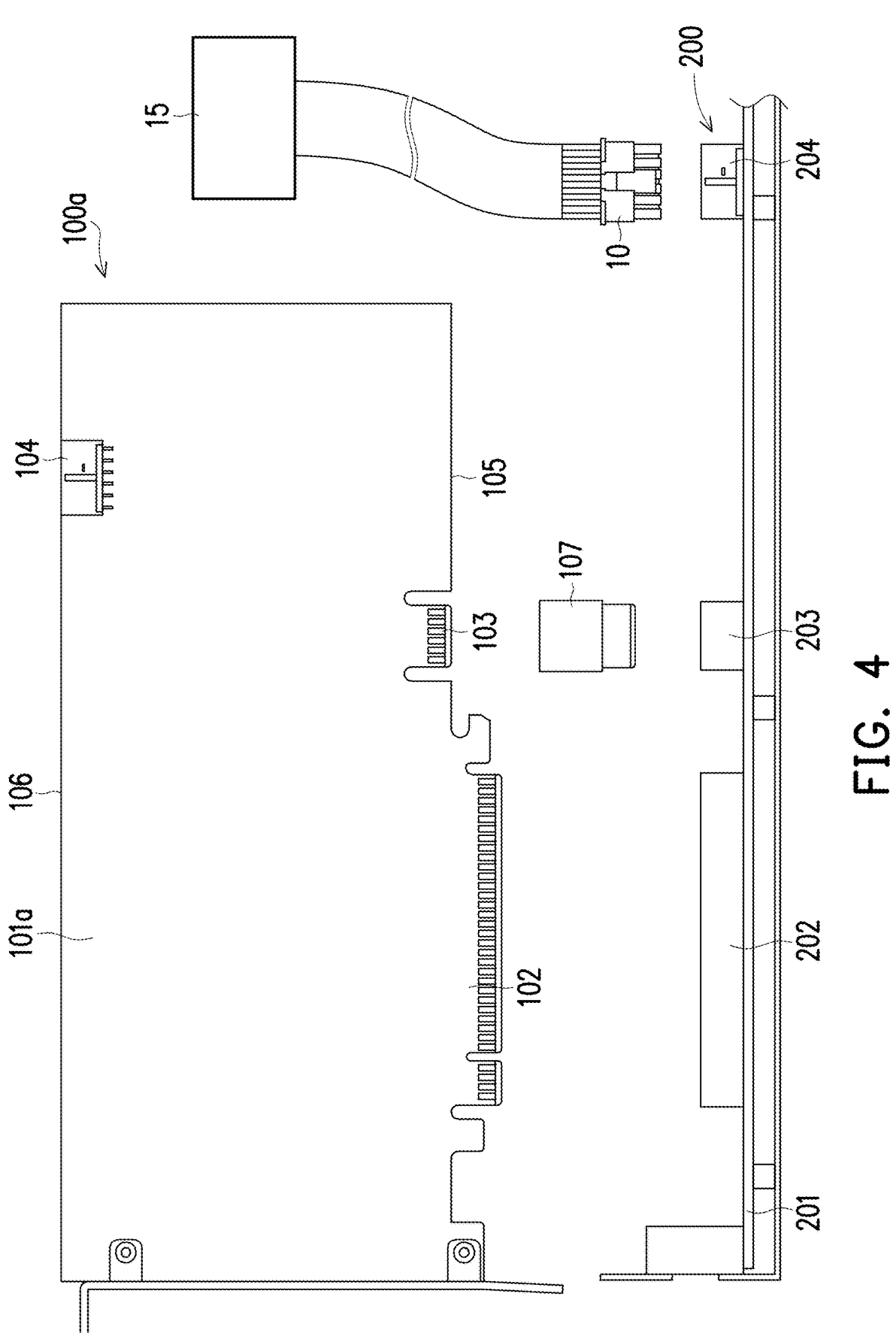
FIG. 4 is a schematic diagram of a circuit board assembly and an expansion card assembly before assembly according to another embodiment of the present disclosure.

The difference between FIG. 4 and FIG. 1 lies in the relative positions of the second expansion card connection port 103 and the expansion card bodies 101 and 101a as well as the adapter 107. The following description focuses on the difference only.

As shown in FIG. 4, the expansion card assembly 100*a* of the present embodiment has the retracted second expansion card connection port 103, the first expansion card connection port 102 protrudes from the first edge 105, and the second expansion card connection port 103 is aligned with or retracted from the first edge 105.

The expansion card assembly 100*a* further includes an adapter 107 detachably plugged into the second expansion card connection port 103. When the adapter 107 is plugged into the second expansion card connection port 103, the adapter 107 protrudes from the first edge 105.

Figure 5:
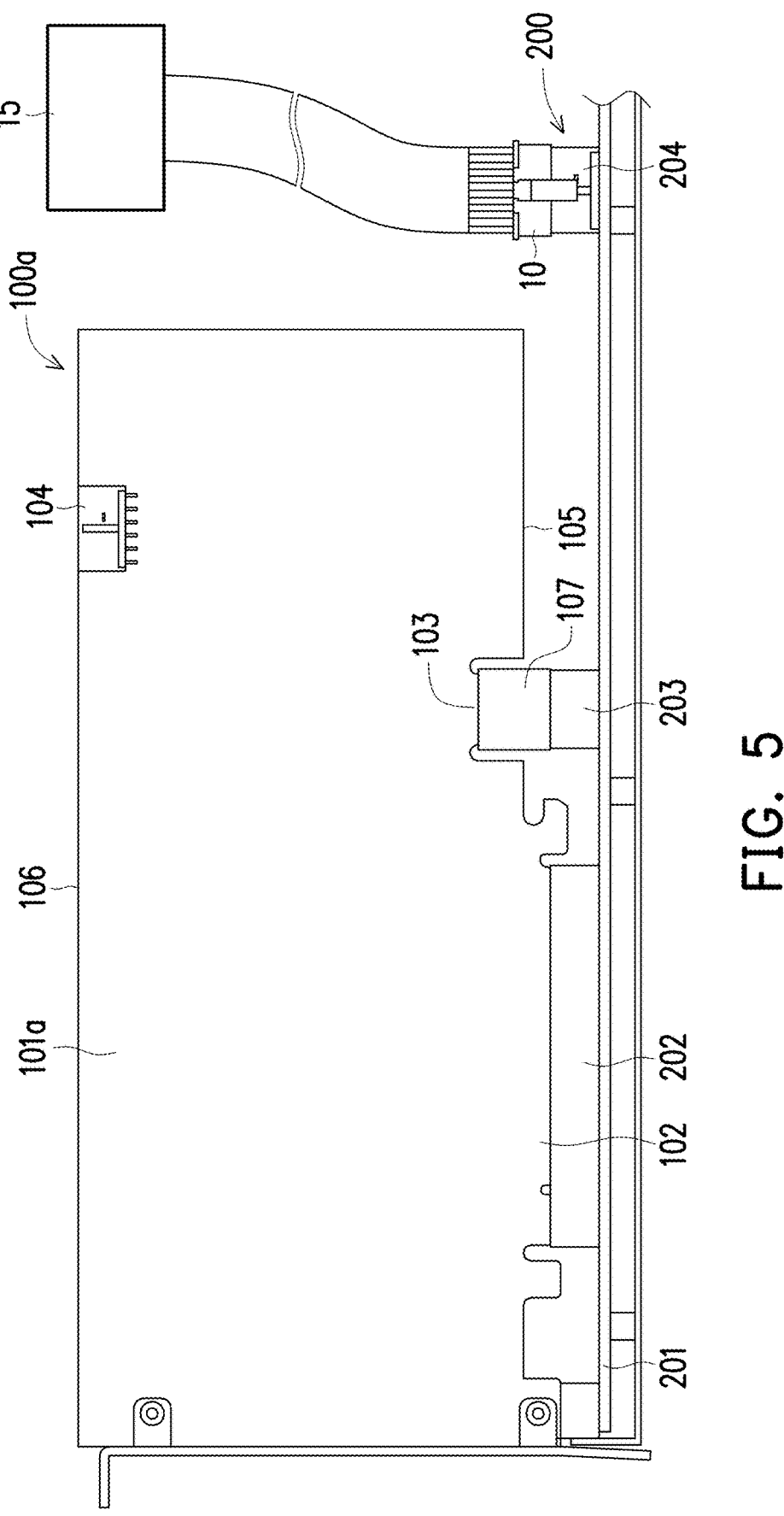
FIG. 5 is a schematic diagram of the circuit board assembly and the expansion card assembly of FIG. 4 after assembly.

As shown in FIG. 5, when the expansion card assembly 100*a* is plugged into the circuit board assembly 200, the first expansion card connection port 102 is docked with the first circuit board connection port 202. The adapter 107 is docked with the second expansion card connection port 103 and the second circuit board connection port 203, and electrically connects the second expansion card connection port 103 to the second circuit board connection port 203. The third circuit board connection port 204 is electrically connected to the expansion card body 101 through the second circuit board connection port 203, the adapter 107 and the second expansion card connection port 103.

Similarly, in this embodiment, the design that the external power supply 15 is connected to the circuit board assembly 200 and not directly connected to the expansion card assembly 100*a* makes it possible to prevent the external power supply 15 from causing the wires to be bent and twisted due to being directly connected to the expansion card assembly 100*a* and/or causing the wires to interfere with the computer case.

Figure 6:
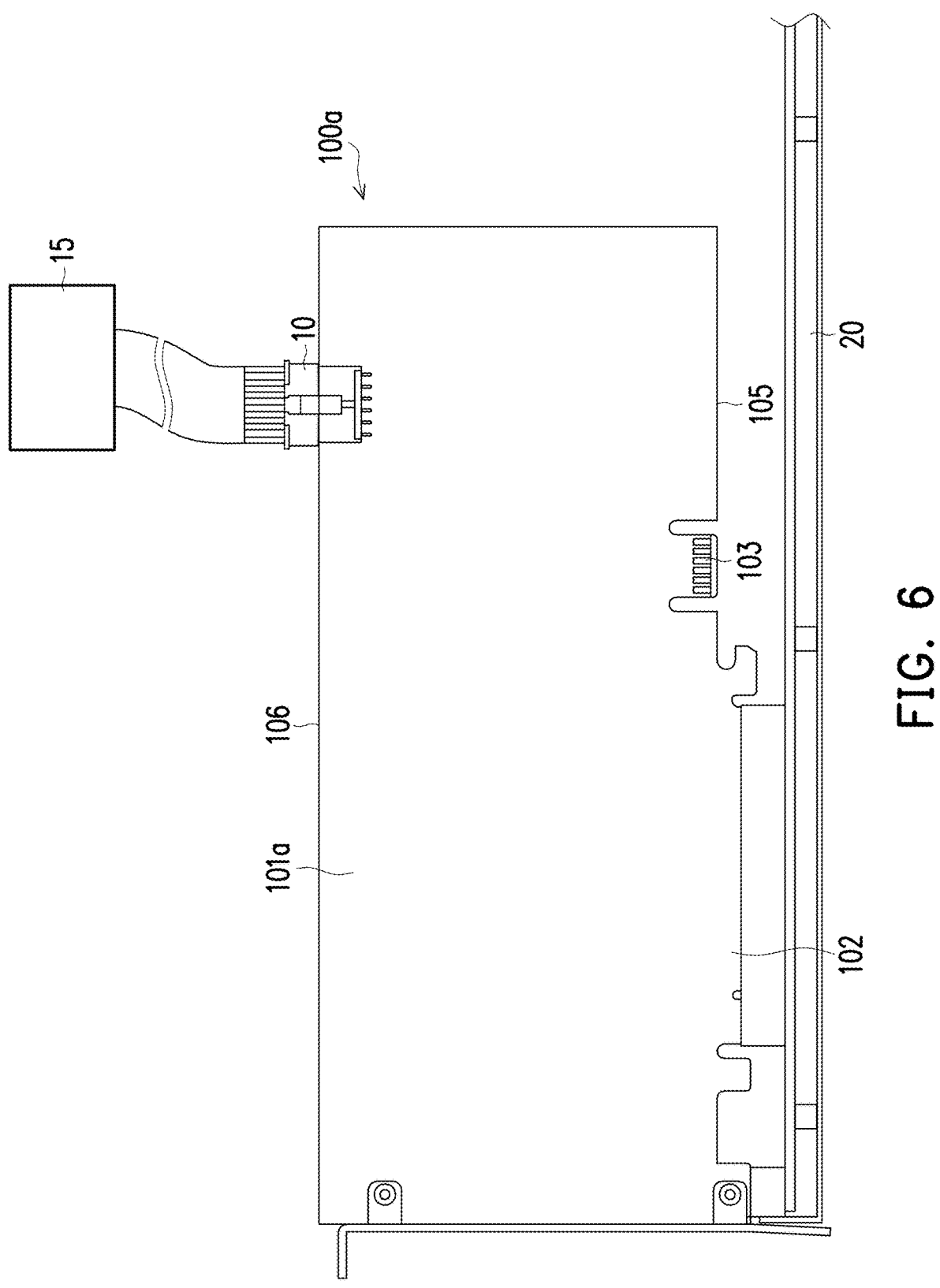
FIG. 6 is a schematic diagram of the expansion card assembly of FIG. 4 and a general circuit board assembly after assembly.

As shown in FIG. 6, when the expansion card assembly 100*a* is plugged into the conventional circuit board assembly 20, the second expansion card connection port 103 retracted from the first edge 105 may not mechanically interfere with the components (not shown), such as a heat dissipation sheet, on the conventional circuit board assembly 20, thereby enhancing the compatibility of the expansion card assembly 100*a* with the conventional circuit board assembly 20. Certainly, when there is no mechanical interference between the expansion card assembly 100 of FIG. 1 and the conventional circuit board assembly 20, the expansion card assembly 100 of FIG. 1 may also be plugged into the conventional circuit board assembly 20.

In this embodiment, when the expansion card assembly 100*a* is plugged into the conventional circuit board assembly 20, the external power supply connection port 10 of the external power supply 15 may be docked with the third expansion card connection port 104 of the expansion card assembly 100*a*, and directly supply power to the expansion card assembly 100*a*.

Figure 7:
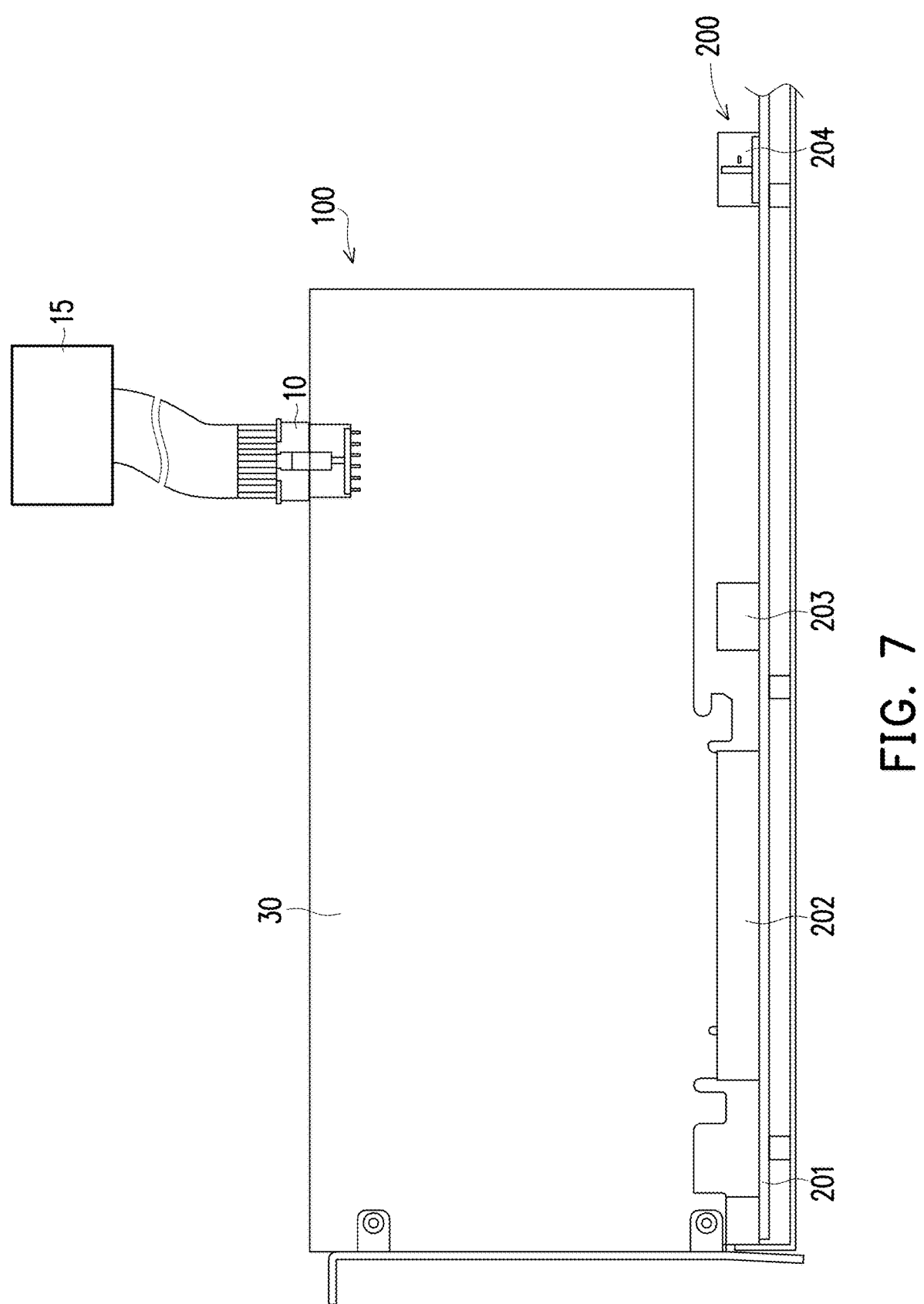
FIG. 7 is a schematic diagram of the circuit board assembly of FIG. 1 and a general expansion card assembly after assembly.

As shown in FIG. 7, the conventional expansion card assembly 30 does not interfere with the second circuit board connection port 203 of the circuit board assembly 200 and may be plugged into the circuit board assembly 200. In addition, when the conventional expansion card assembly 30 is inserted into the circuit board assembly 200, the external power connection port 10 of the external power supply 15 may be docked with the external power connection port on the conventional expansion card assembly 30, and power is supplied to the conventional expansion card assembly 30.

Figure 8:
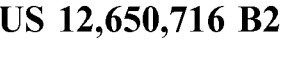
FIG. 8 is a schematic diagram of a circuit board assembly and an expansion card assembly before assembly according to another embodiment of the present disclosure.

The difference between FIG. 8 and FIG. 1 lies in the circuit board assemblies 200 and 200*a*, and the description focuses on the difference only.

Please refer to FIG. 8, the circuit board assembly 200*a* of this embodiment is, for example, a PCI-E adapter plate, and the conventional circuit board assembly 20 is, for example, a motherboard. In addition to including the circuit board body 201*a*, the first circuit board connection port 202*a*, the second circuit board connection port 203*a* and the third circuit board connection port 204*a*, the circuit board assembly 200*a* further includes a fourth circuit board connection port 205*a* electrically connected to the circuit board body 201*a*. The fourth circuit board connection port 205*a* is connected to the circuit board body 201*a* through a flexible cable, for example, but is not limited thereto.

In this embodiment, the first circuit board connection port 202*a* is a PCI-E connection port, the second circuit board connection port 203*a* is a power transmission connection port, the third circuit board connection port 204*a* is an external power supply connection port, and the fourth circuit board connection port 205*a* is a PCI-E connection port.

Figure 9:
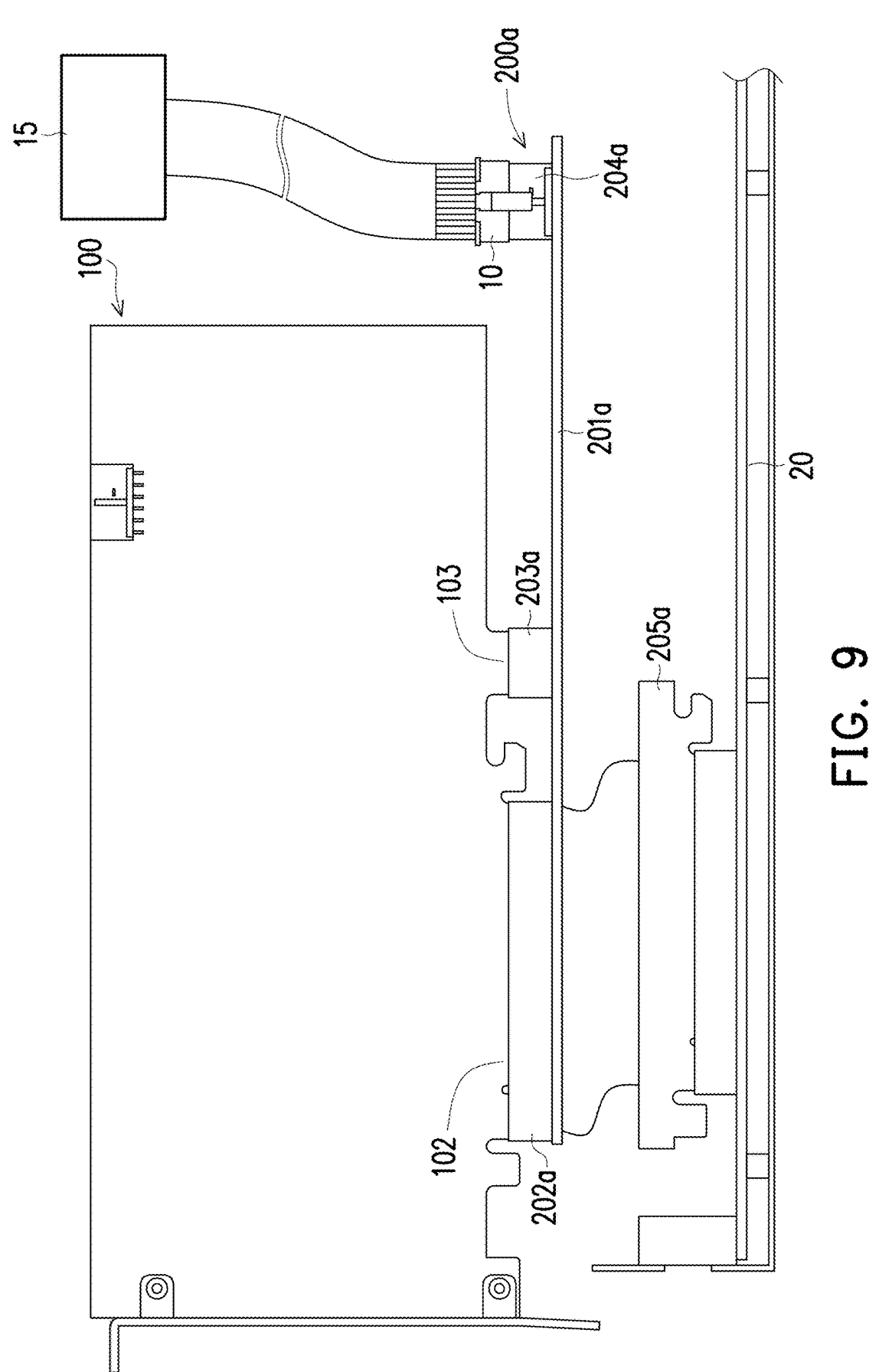
FIG. 9 is a schematic diagram of the circuit board assembly and the expansion card assembly of FIG. 8 after assembly.

As shown in FIG. 9, when the expansion card assembly 100 is plugged into the circuit board assembly 200*a*, the fourth circuit board connection port 205*a* is plugged into the conventional circuit board assembly 20. The external power supply connection port 10 of the external power supply 15 may be docked with the third circuit board connection port 204*a*, and supplies power to the expansion card assembly 100 through the third circuit board connection port 204*a*, the second circuit board connection port 203*a* and the second expansion card connection port 103.

It should be noted that, in this embodiment, since the circuit board body 201*a* and the fourth circuit board connection port 205*a* are electrically connected through a flexible cable, such design may increase the configuration of the expansion card assembly 100 and the circuit board assembly 200*a* on various types of computer cases to improve the adaptability with various types of computer cases and motherboards.

In summary, in this present disclosure, the external power supply may supply power to the expansion card assembly through the circuit board assembly. Since the external power supply may not be directly connected to the expansion card assembly, it is possible to prevent the external power supply from causing the wires to be bent and twisted due to being directly connected to the expansion card assembly and/or causing the wires to interfere with the computer case, thereby improving the safety of use, the adaptability of the wire and the computer case, as well as the aesthetic quality of overall appearance. Moreover, in an embodiment, the second expansion card connection port of the expansion card assembly may be designed in a retracted manner, so as to avoid mechanical interference with the conventional circuit board assembly and improve compatibility with the conventional circuit board assembly.

What is claimed is:

1. An expansion card assembly, comprising:

an expansion card body;

a first expansion card connection port, disposed on the expansion card body;

a second expansion card connection port, disposed on the expansion card body, wherein an interface of the first expansion card connection port is different from an interface of the second expansion card connection port, wherein the expansion card assembly comprises a first edge, the first expansion card connection port protrudes from the first edge, and the second expansion card connection port is aligned with or retracted from the first edge; and an adapter detachably plugged into the second expansion card connection port, when the adapter is plugged into the second expansion card connection port, the adapter protrudes from the first edge and is aligned with the first expansion card connection port.

2. The expansion card assembly according to claim 1, wherein the first expansion card connection port is a PCI-E connection port, and the second expansion card connection port is a power transmission connection port.

3. The expansion card assembly according to claim 1, further comprising a third expansion card connection port, wherein the expansion card body comprises a second edge, and the third expansion card connection port is disposed on the expansion card body and close to the second edge, and the third expansion card connection port is an external power supply connection port.

4. A circuit board assembly, comprising:

a circuit board body;

a first circuit board connection port, disposed on the circuit board body;

a second circuit board connection port, disposed on the circuit board body, wherein an interface of the first circuit board connection port is different from an interface of the second circuit board connection port, the first circuit board connection port and the second circuit board connection port are close to each other and arranged along an axis; and a third circuit board connection port, disposed on the circuit board body and electrically connected to the second circuit board connection port, wherein the first circuit board connection port is a PCI-E connection port, the second circuit board connection port is a power transmission connection port independent from the PCI-E connection port, and pins of the power transmission connection port do not belong to some of pins of the PCI-E connection port.

5. The circuit board assembly according to claim 4, wherein the third circuit board connection port is an external power supply connection port.

6. An electronic device, comprising:

a circuit board assembly, comprising:

a circuit board body;

a first circuit board connection port, disposed on the circuit board body;

a second circuit board connection port, disposed on the circuit board body, wherein an interface of the first circuit board connection port is different from an interface of the second circuit board connection port, the first circuit board connection port and the second circuit board connection port are close to each other and arranged along an axis; and a third circuit board connection port, disposed on the circuit board body and electrically connected to the second circuit board connection port; and an expansion card assembly, pluggably disposed on the circuit board assembly, and comprising:

an expansion card body;

a first expansion card connection port, disposed on the expansion card body; and a second expansion card connection port, disposed on the expansion card body, wherein an interface of the first expansion card connection port is different from an interface of the second expansion card connection port, when the expansion card assembly is plugged into the circuit board assembly, the first expansion card connection port is docked with the first circuit board connection port, the second expansion card connection port is docked with the second circuit board connection port, and the third circuit board connection port is electrically connected to the expansion card body through the second circuit board connection port and the second expansion card connection port, wherein the expansion card body comprises a first edge, the first expansion card connection port protrudes from the first edge, and the second expansion card connection port is aligned with or retracted from the first edge, wherein the expansion card assembly further comprises an adapter detachably plugged into the second expansion card connection port, when the adapter is plugged into the second expansion card connection port, the adapter protrudes from the first edge and is aligned with the first expansion card connection port.

7. The electronic device according to claim 6, wherein each of the first expansion card connection port and the first circuit board connection port is a PCI-E connection port, and each of the second expansion card connection port and the second circuit board connection port is a power transmission connection port, the third circuit board connection port is an external power supply connection port.

8. The electronic device according to claim 6, wherein the expansion card assembly further comprises a third expansion card connection port, wherein the expansion card body comprises a second edge, the third expansion card connection port is disposed on the expansion card body and close to the second edge, and the third expansion card connection port is an external power supply connection port.

* * * * *